United States Patent
Nuckolls

[15] 3,678,371
[45] July 18, 1972

[54] LAMP CONTROL CIRCUIT WITH HIGH LEAKAGE REACTANCE TRANSFORMER AND CONTROLLED BILATERAL SWITCHING MEANS

[72] Inventor: Joe A. Nuckolls, Hendersonville, N.C.
[73] Assignee: General Electric Company
[22] Filed: Nov. 25, 1968
[21] Appl. No.: 778,687

[52] U.S. Cl.................323/6, 315/126, 315/199, 315/207, 315/278, 315/306, 323/8, 323/48, 323/62
[51] Int. Cl...........................................H05b 41/38
[58] Field of Search............315/199, 100 U, 219, 276, 277, 315/282, 287; 307/305, 305 A; 323/6, 45, 48

[56] References Cited
UNITED STATES PATENTS

| | | |
|---|---|---|
| 3,310,687 | 3/1967 | Howell....................307/88.5 |
| 3,457,458 | 7/1969 | Paget et al..............315/284 |
| 3,466,500 | 9/1969 | Peek.......................315/100 |
| 3,479,559 | 11/1969 | Pajet......................315/105 |
| 3,353,032 | 11/1967 | Morgan et al...........302/88.5 |
| 3,407,334 | 10/1968 | Attewell.................315/278 |
| 3,235,769 | 2/1966 | Wattenbach............315/176 |
| 3,336,501 | 8/1967 | Segawa..................315/105 |
| 3,364,386 | 1/1968 | Segawa et al..........315/103 |

Primary Examiner—John W. Huckert
Assistant Examiner—William D. Larkins
Attorney—Sidney Greenberg, J. Wesley Haubner, Frank L. Neuhauser and Oscar B. Waddell

[57] ABSTRACT

Load power control device for control of the operation of gaseous discharge lamps or other loads comprises a high reactance transformer having the primary connected to an alternating current voltage source, a secondary connected to the load, and a bi-lateral switch connected at the output of the high reactance transformer and in parallel with the load for controlling the power applied to the load.

3 Claims, 5 Drawing Figures

PATENTED JUL 18 1972

Inventor,
Joe H. Nuckolls,
by Sidney Greenberg
His Attorney.

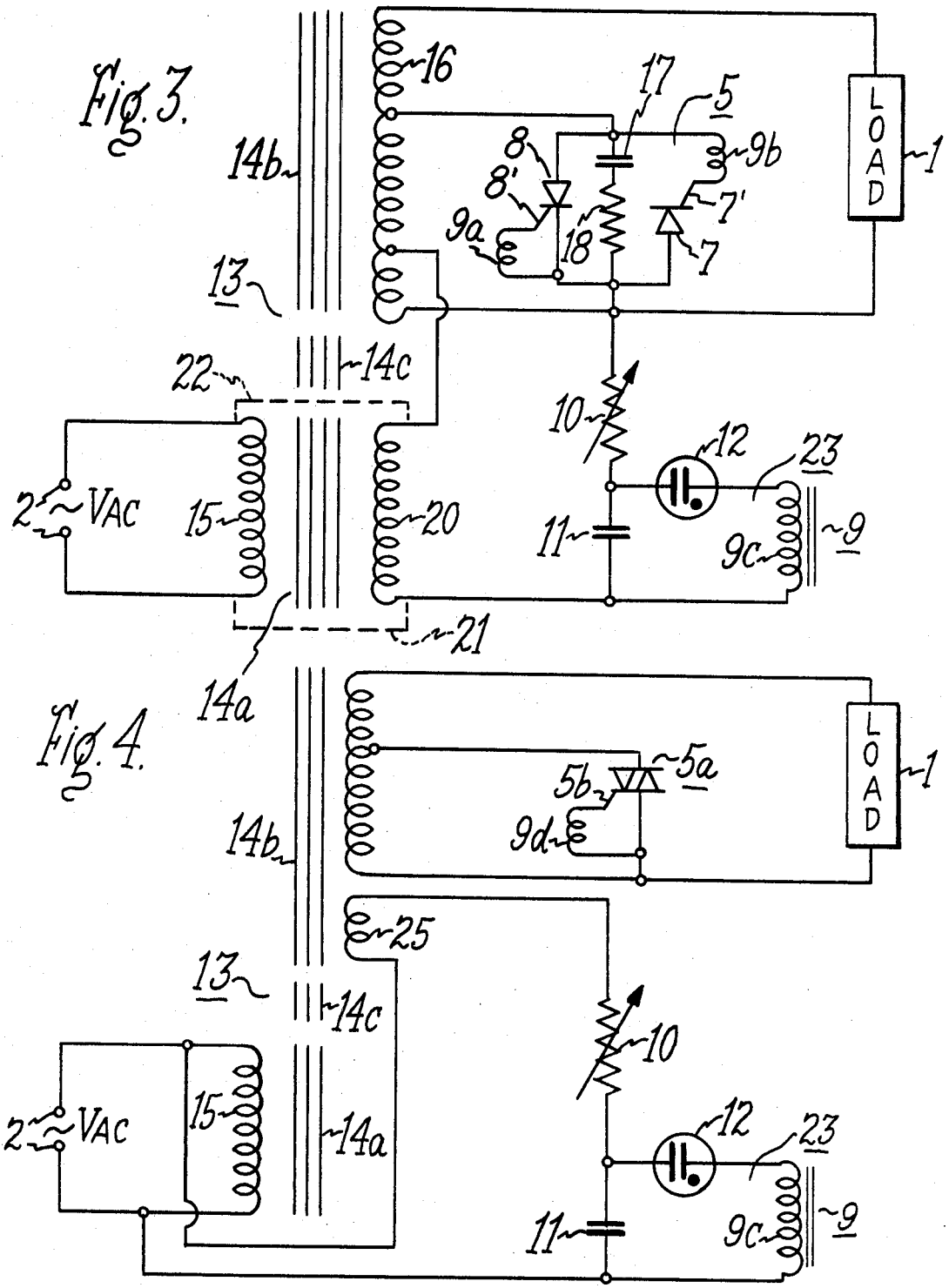

LAMP CONTROL CIRCUIT WITH HIGH LEAKAGE REACTANCE TRANSFORMER AND CONTROLLED BILATERAL SWITCHING MEANS

The present invention relates to electrical load control devices, and particularly to electrical load control devices of static type.

It is an object of the invention to provide a load control device of the above type which is flexible in operation and capable of operating and controlling loads, such as gaseous discharge lamps, with a wide load impedance range.

It is another object of the invention to provide a load control device of the above type incorporating solid state phase control switching means.

Another object of the invention is to provide a device of the above type wherein the switching operation for load control is synchronized with the source voltage and load voltage.

A further object of the invention is to provide a device of the above type which is compact in structure and of low cost, is reliable in operation, has low losses, and is versatile in application.

Other objects and advantages will become apparent from the following description and the appended claims.

With the above objects in view, the present invention in a broad aspect relates to a load control circuit for controlling power to a load comprising, in combination, a source of alternating current, constant inductive reactance means such as a high leakage transformer connected in series with the source, a load connected in series with the reactance and the source, and controlled bi-lateral switch means such as silicon controlled rectifiers in parallel with the load at the output of the reactance for displacing current from the load in a controlled manner.

The invention will be better understood from the following description taken in conjunction with the accompanying drawings, in which:

FIG. 3 is a circuit diagram of an embodiment of the invention having a particular type and arrangement of switching means;

FIG. 4 is a circuit diagram showing a different embodiment of the switching means and actuating means therefor.

Figure 1:
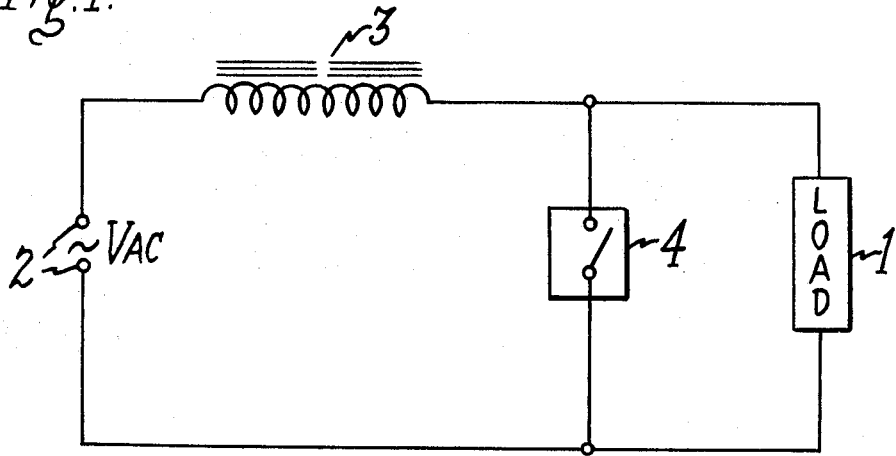
FIG. 1 is a simplified circuit diagram of the load control device of the invention.

Referring now to the drawing, and particularly to FIG. 1, there is shown a circuit diagram of the load control system of the invention in its broad aspect which comprises a load 1, such as a gaseous discharge lamp (e.g., mercury vapor or sodium vapor lamp) connected to terminals 2 of a source of alternating current in series with a constant inductive reactance 3 constituted by an induction device providing linear reactance, such as, for example, a choke coil having an air gap in its magnetic core and an alternating current or bi-lateral switching device 4 connected across load 1 at the output of reactance 3. When load 1 is energized by the alternating current source, reactance 3 serves as a ballast to provide a maximum current in the lamp load circuit and limiting the amount of current that can be drawn by the lamp. In accordance with the invention, the controlled bi-lateral switch 4, which may have the structure and arrangement shown more particularly in FIG. 3 as switch 5, is connected across load 1 and operated in a controlled manner to effectively displace current from the load in order to control its operation in a desired manner. Thus, as alternating current flows to load 1 through reactance 3 when the circuit is energized, switch 4 may be closed at a predetermined time during each half cycle, as more fully described below, thus diverting current away from the load for the duration of that half cycle. The longer the switch remains closed, the less the power that is transmitted to the load. Hence, by controlling the time and duration of the switching function, the level of power supplied to the load may be varied over a wide range.

Figure 2:
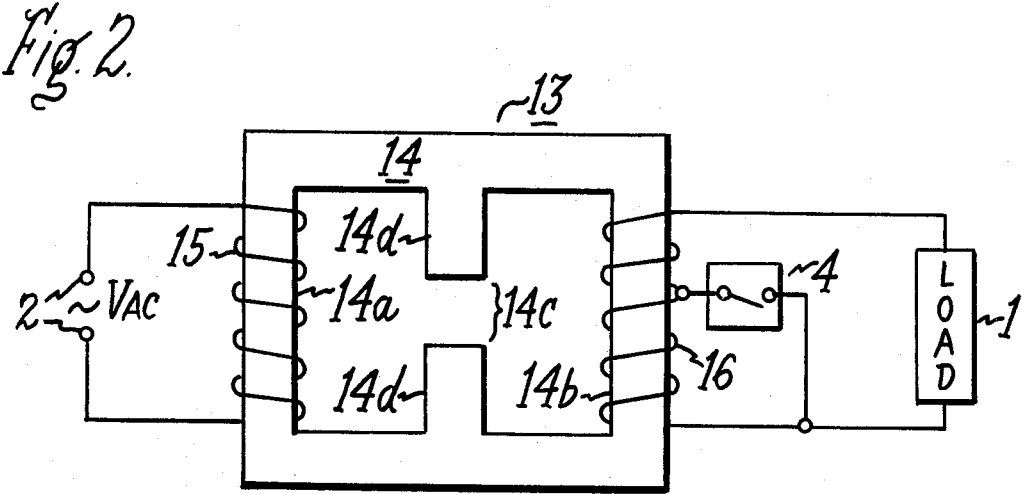
FIG. 2 is a diagrammatic illustration of an embodiment of the invention.

In FIG. 2 there is shown an embodiment of the invention wherein the leakage reactance 3 shown in FIG. 1 is constituted by a transformer 13 having a closed core 14 on which primary and secondary coils 15 and 16 are wound on opposite legs 14a, 14b and which has an intermediate leg 14d between the primary and secondary windings having an air gap 14c therein which provides leakage reactance between the windings. Such leakage reactance provides a buffering or decoupling effect between the voltage source and switch 4 to permit the latter to effectively short circuit the secondary circuit for control of the load. By thus arranging switch 4 at the output of the leakage reactance and in parallel with the load, the switch is not subjected to the entire energy transmitted to the load or to the full source voltage, and accordingly solid state devices of relatively simple, low cost type can be effectively utilized for load control as compared to an arrangement in which the switch is in series with the load. Also, by thus arranging switch 4 in shunt with the load, the source energy may be directly applied to the load without the necessity of passing through the switch, and the starting and continued operation of the load is thereby facilitated.

Controlled switch means 4 as shown in FIGS. 1 and 2 are intended to include a bi-lateral switching device and a triggering means for actuating the operation thereof. A suitable system of this type is shown in FIG. 3, wherein switching circuit 5 when actuated serves to displace current of desired amount from load 1 to thereby control its operation. As shown in FIG. 3, switching circuit 5 and actuating trigger circuit 23 in series therewith are connected in parallel with load 1 to secondary winding 16 of transformer 13, which corresponds to the transformer of high leakage reactance shown in FIG. 2. Controlled switching circuit 5 includes a paralleled pair of oppositely poled controlled rectifiers 7 and 8, which typically are silicon controlled rectifiers (SCR's) having control (gate) electrodes 7', 8' by means of which the SCR's are rendered conductive for unidirectional flow of current when a signal pulse is applied to the respective control electrodes. Control electrodes 7', 8' are connected respectively to secondary windings 9a, 9b of coupling transformer 9. Transformer 9 serves to isolate the controlled rectifiers from each other and circuit 5 from the trigger pulse generating circuit described below. The signal generating or actuating circuit 23 comprises variable resistance 10 connected to secondary winding 16 in series with charging capacitor 11.

A discharge loop in actuating circuit 23 for discharging capacitor 11 includes transformer primary 9c and a voltage sensitive device 12, typically a neon glow lamp, which is a bi-laterally conducting diode, and is also referred to herein as a voltage sensitive symmetrical switch means, which becomes conductive only upon the application of a predetermined voltage thereto. Other symmetrical switch devices which could alternatively be used are a diac, a symmetrical Shockley device, or the like. Voltage sensitive switch 12 is connected in parallel with charging capacitor 11 but is effectively connected in series discharge relation therewith and with transformer primary 9c as shown.

In the above described circuit arrangement, on each half cycle of the alternating current input derived from secondary winding 16, one of the controlled rectifiers 7 and 8 will have a positive anode and the other a positive cathode. Therefore, a control signal applied to control electrode 7' and 8' will place only one of the controlled rectifiers in a conduction mode on each half cycle. A delay in the point in the alternating current input cycle at which the control signal pulses are applied to render the rectifier conductive is known as phase control. The characteristics and function of SCR switching circuit 5 and its actuating circuit 23 are more fully described in U.S. Pat. No. 3,249,807 - Nuckolls, the disclosure of which is incorporated herein by reference. As there described, voltage sensitive switch 12 becomes conductive as a result of the voltage buildup on capacitor 11, capacitor 11 partially discharges, and a signal pulse is applied to transformer primary 9c which induces a current pulse of a particular duration and at a particular time in the half cycle. The controlled rectifier 7 or 8 which has an anode positive with respect to the cathode will then be triggered to conduction by the pulse current applied to control electrodes 7', 8', and the voltage which has built up across the rectifier falls substantially to zero. The controlled rectifier 7 or 8 then permits current to flow, consequently short circuiting load 1 and displacing current therefrom, the amount of which depends on the duration and time of the control pulse. On the next half cycle as the anode voltage becomes negative, the controlled rectifier 7 or 8 which was conductive becomes nonconductive and no current is transmitted through the switching circuit until the signal generating circuit fires the other controlled rectifier. The time in the half cycle at which the rectifier is gated is adjustable by the level of resistance 10.

The RC network shown in the FIG. 3 circuit across the SCR's comprising capacitor 17 and resistor 18 limits the rate of voltage rise across the SCR's during operation, and also serves to supply holding current through the SCR's immediately after triggering.

By suitable adjustment of variable resistance 10, which may be employed as a manually operated control means for a lighting circuit or other load, the current displaced from load 1 may be varied by means of the described SCR phase control device. The change in current thus produced in lamp load 1 results in variation of the power applied thereto and thereby the level of light produced therefrom.

Although the switching loop incorporating circuit 5 is shown in FIG. 3 as including only a tapped portion of secondary winding 16, it will be understood that the entire secondary winding or any other portion thereof may be included. The point on the winding to which the switching circuit is tapped will depend, for example, on the voltage rating of the SCR's.

Also shown in the FIG. 3 circuit are means for synchronizing the actuating trigger pulses to both the input voltage and the current through the load and SCR's. For this purpose, an auxiliary winding 20 connected at one side of trigger circuit 23 is arranged on transformer core 14a adjacent main primary winding 15 and connected at its other side to a tap on main secondary winding 16. In this way, the driving voltage for trigger circuit 23 consists of two voltage components, i.e., the supply voltage derived from primary winding 15 and the load voltage derived from the tapped portion of main secondary winding 16. The point on secondary winding 16 at which triggering circuit 23 is tapped depends on the desired ratio of load synchronizing voltage to the trigger driving voltage, which ratio may typically be about 40 percent.

Auxiliary winding 20 may, in an alternative arrangement, be dispensed with and trigger circuit 23 directly connected to the leads of primary winding 15, as indicated by conductors 21, 22 shown in interrupted lines in FIG. 3, for the purpose of synchronization with the line voltage.

FIG. 4 shows a modification of the FIG. 3 circuit wherein triac 5a having a control electrode 5b replaces the oppositely poled SCR's in the switching circuit. A "triac" is an alternating current semiconductor controlled switch having a single control electrode which, when gated, causes the switch to conduct current in the direction as indicated by the forward bias condition of the semiconductor. A triac may also be described as a bi-directional triode for gate control of alternating current power. In this case, secondary winding 9d of pulse transformer 9 is connected to the triac control electrode 5b.

In the FIG. 4 circuit, trigger circuit 23 is synchronized with the load voltage by a series connection with an auxiliary secondary winding 25 which is arranged adjacent main secondary winding 16, and synchronization with the supply voltage is achieved by connection of this circuit to the leads of primary winding 15 as shown.

Figure 5:
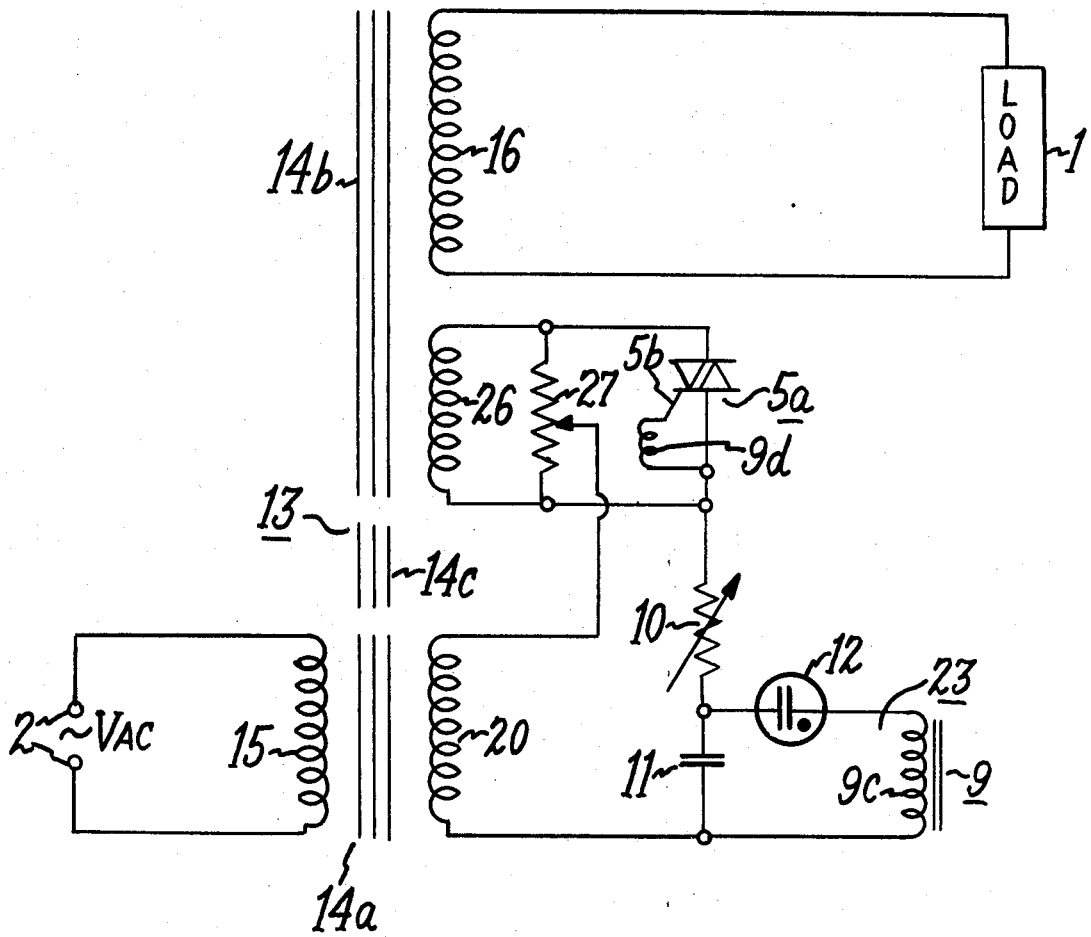
FIG. 5 is a circuit diagram showing still a different arrangement of the switching means and actuating means therefor.

FIG. 5 shows a further modification of the above described circuits wherein triac 5a is connected in an auxiliary loop separate from the load circuit and including an auxiliary secondary winding 26 arranged adjacent main secondary winding 16. In such arrangement, switching means 5a is effectively in parallel with load 1, and upon closing of the switch, current is displaced from the load in a manner equivalent to that previously described. When current flows in auxiliary winding 26, the ampere-turns in the auxiliary winding directly subtract from the total ampere-turns available to the main secondary coil (output) circuit, and hence the magnitude of the output (Load) current is reduced.

Also provided in the FIG. 5 circuit is a potentiometer 27 connected across auxiliary winding 26 to which trigger circuit 23 is connected via auxiliary primary winding 20. The latter connection being adjustable as shown, the voltage level tapped by the trigger circuit 23 for synchronization with the load voltage may be varied as desired.

While a phase control arrangement as described above is preferred in accordance with the invention, other means may be substituted for SCR circuit 5 or triac 5a for the switching function, as for example, oppositely poled power transistors, or other symmetrical semiconductor switch means, or switch devices such as thyratrons or ignitrons.

Various feedback arrangements may be readily incorporated in the disclosed circuits to compensate for variations of load voltage, load current, and other conditions. Such feedback systems are disclosed, for example, in U.S. Pat. No. 3,344,311 - Nuckolls. As there disclosed, the feedback circuits may include voltage or current sensing means suitably connected in the load operating circuit and having an incandescent lamp - photocell combination connected across the RC network of the switch actuating circuit to influence the delay time constant of that circuit in response to the output of the feedback sensor.

While the described load control device has been disclosed as applicable for use in the control of lighting systems, it will be understood that it may also be found useful for control of various other types of apparatus such as electric ovens and other heating devices, welding apparatus, and the like.

While the present invention has been described with reference to particular embodiments thereof, it will be understood that numerous modifications may be made by those skilled in the art without departing from the scope of the invention. Therefore, the appended claims are intended to cover all such equivalent variations as come within the true spirit and scope of the invention.

What I claim as new and desire to secure by Letters Patent of the United States is:

1. A load control circuit for controlling power to a load comprising, in combination, a source of alternating current, constant inductive reactance means connected to said source, a load connected to said reactance means and said source, and controlled bilateral switch means connected in parallel with said load to said reactance means for displacing current from the load in a controlled manner, said constant inductive reactance means comprising a high leakage reactance transformer having coil means and a magnetic core therefor, said core having a non-magnetic gap therein, said transformer comprising primary winding meanS and secondary winding means on said core, and actuating means connected to said switch means for rendering the same conductive in either direction, said actuating means being connected to said secondary winding means for synchronization with the voltage thereof, said primary winding means comprising a main primary winding connected to said alternating current source and an auxiliary winding connected to said actuating means, said actuating means being connected to said primary winding means for synchronization with the voltage of said source.

2. A load control circuit for controllinG power to a load comprising, in combination, a source of alternating current, constant inductive reactance means connected to said source, a load connected to said reactance means and said source, and controlled bi-lateral switch means connected in parallel with said load to said reactance means for displacing current from the load in a controlled manner, said constant inductive reactance means comprising a high leakage reactance transformer having coil means and a magnetic core therefor, said core having a non-magnetic gap therein, said transformer comprising primary winding means and secondary winding means on said core, and actuating means connected to said switch means for rendering the same conductive in either direction, said actuating means being connected to said secondary winding means for synchronization with the voltage thereof, said secondary winding means comprising a main secondary winding connected to said load and an auxiliary secondary winding, said actuating means being connected to said auxiliary secondary winding.

3. A load control circuit for controlling power to a load comprising, in combination, a source of alternating current, constant inductive reactance means connected to said source, a load connected to said reactance means and said source, and controlled bi-lateral switch means connected in parallel with said load to said reactance means for displacing current from the load in a controlled manner, said constant inductive reactance means comprising a high leakage reactance transformer having coil means and a magnetic core therefor, said core having a non-magnetic gap therein, said transformer comprising primary winding means and secondary winding means on said core, said secondary winding meanS comprising a main secondary winding and an auxiliary secondary winding, said load being connected to said main secondary winding, and said switch means being connected to said auxiliary secondary winding.

* * * * *